(12) United States Patent
Thomas et al.

(10) Patent No.: US 8,930,558 B2
(45) Date of Patent: *Jan. 6, 2015

(54) PROXYING MULTIPLE TARGETS AS A VIRTUAL TARGET USING IDENTIFIER RANGES

(75) Inventors: Lintu Thomas, San Jose, CA (US); Suresh Vobbilisetty, San Jose, CA (US)

(73) Assignee: Brocade Communications Systems, Inc., San Jose, CA (US)

( * ) Notice: Subject to any disclaimer, the term of this patent is extended or adjusted under 35 U.S.C. 154(b) by 1423 days.

This patent is subject to a terminal disclaimer.

(21) Appl. No.: 12/169,724

(22) Filed: Jul. 9, 2008

(65) Prior Publication Data

US 2010/0011114 A1   Jan. 14, 2010

(51) Int. Cl.
| G06F 15/16 | (2006.01) |
| H04L 12/66 | (2006.01) |
| H04L 12/46 | (2006.01) |
| H04L 29/08 | (2006.01) |
| H04L 29/06 | (2006.01) |

(52) U.S. Cl.
CPC ............ *H04L 12/66* (2013.01); *H04L 12/4625* (2013.01); *H04L 67/1097* (2013.01); *H04L 69/08* (2013.01)
USPC ........................................................ 709/230

(58) Field of Classification Search
None
See application file for complete search history.

(56) References Cited

U.S. PATENT DOCUMENTS

| 6,741,605 | B1 * | 5/2004 | Vanhoof et al. ................ 370/447 |
| 7,843,907 | B1 * | 11/2010 | Abou-Emara et al. ......... 370/386 |
| 2003/0078947 | A1 * | 4/2003 | Garg et al. .................... 707/204 |
| 2005/0157730 | A1 * | 7/2005 | Grant et al. .................... 370/401 |
| 2006/0013222 | A1 * | 1/2006 | Rangan et al. ................. 370/389 |
| 2006/0242312 | A1 * | 10/2006 | Crespi et al. .................. 709/230 |
| 2007/0058619 | A1 * | 3/2007 | Gopal Gowda et al. ....... 370/386 |
| 2007/0271307 | A1 * | 11/2007 | Bergsten ........................ 707/200 |
| 2009/0234959 | A1 * | 9/2009 | Thomas ......................... 709/230 |

OTHER PUBLICATIONS

Birk, et al., Distributed-and-Split Data-Control Extension to SCSI for Scalable Storage Area Networks., Proceedings of the 10th Symposium on High Performance Interconnects Hot Interconnects (HotI'02)., 2002 IEEE.*
Morrey et el., Peabody: The Time Travelling Disk., Proceedings of the 20th IEEE/11th NASA Goddard Conference on Mass Storage Systems and Technologies (MSS'03)., 2003 IEEE.*

* cited by examiner

*Primary Examiner* — Kostas Katsikis
(74) *Attorney, Agent, or Firm* — Conley Rose, P.C.

(57) ABSTRACT

A gateway includes a Fibre Channel ("FC") port configured to couple to multiple FC targets, and an iSCSI port configured to couple to an iSCSI initiator. The iSCSI port is configured to facilitate communication between the FC targets and the iSCSI initiator, and proxy the multiple FC targets as a virtual iSCSI target. The iSCSI port is also configured to divide the Logical Unit Number ("LUN") range into a plurality of subdivided LUN ranges, and associate the FC targets with the subdivided LUN ranges.

9 Claims, 5 Drawing Sheets

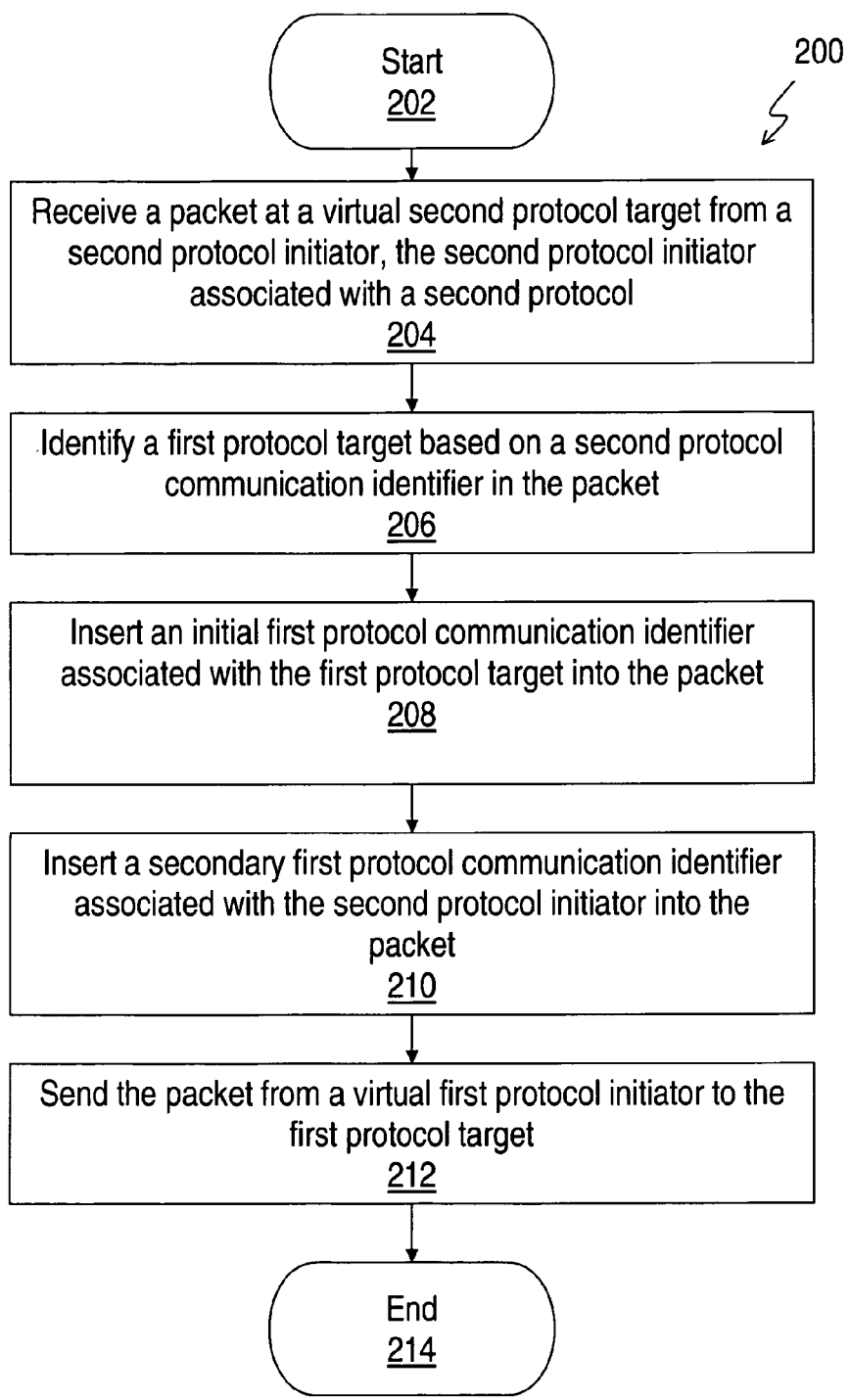

US 8,930,558 B2

PROXYING MULTIPLE TARGETS AS A VIRTUAL TARGET USING IDENTIFIER RANGES

BACKGROUND

Computer networking has become the focus of much attention in the data communications industry. Performance improvements in processors and peripherals, along with the move to distributed architectures such as client-server configurations, have spawned increasingly data-intensive networking applications. Various protocols have been developed to provide the necessary communications capacity corresponding to such applications. Hence, there exists a need for intercommunication between computer networks that use different protocols. For example, many customers would prefer to expand their existing networks with the latest protocol. Other customers simply need low-latency communication between dissimilar protocols. Integrating protocols is therefore highly desirable.

SUMMARY

Devices, systems, and methods for proxying multiple targets as a virtual target are described herein. A gateway includes a Fibre Channel ("FC") port configured to couple to multiple FC targets, and an iSCSI port configured to couple to an iSCSI initiator. The iSCSI port is configured to facilitate communication between the FC targets and the iSCSI initiator, and proxy the plurality of FC targets as a virtual iSCSI target. The iSCSI port is also configured to divide the Logical Unit Number ("LUN") range associated with the iSCSI protocol into a plurality of subdivided LUN ranges, and associate the FC targets with the subdivided LUN ranges.

A method includes receiving a packet at a virtual iSCSI target from an iSCSI initiator. The method further includes identifying a FC target based on a LUN in the packet, and inserting the Destination Identifier ("D_ID") associated with the FC target into the packet. The method further includes inserting an Originator Exchange Identifier ("OX_ID") associated with the iSCSI initiator, out of multiple iSCSI initiators, into the packet, and sending the packet from a virtual FC initiator, out of multiple virtual FC initiators, to the FC target.

A computer-readable medium stores a software program that, when executed by a processor, causes the processor to receive a packet at a virtual iSCSI target from an iSCSI initiator. The processor is further caused to identify a FC target based on a LUN in the packet, and insert the Destination Identifier ("D_ID") associated with the FC target into the packet. The processor is further caused to insert an Originator Exchange Identifier ("OX_ID") associated with the iSCSI initiator, out of multiple iSCSI initiators, into the packet, and send the packet from a virtual FC initiator, out of multiple virtual FC initiators, to the FC target.

These and other features and advantages will be more clearly understood from the following detailed description taken in conjunction with the accompanying drawings and claims.

BRIEF DESCRIPTION OF THE DRAWINGS

For a more complete understanding of the present disclosure and the advantages thereof, reference is now made to the accompanying drawings and detailed description, wherein like reference numerals represent like parts:

FIG. 2 illustrates a method for proxying targets in accordance with at least some embodiments;

NOTATION AND NOMENCLATURE

Certain terms are used throughout the following claims and discussion to refer to particular components. This document does not intend to distinguish between components that differ in name but not function. In the following discussion and in the claims, the terms "including" and "comprising" are used in an open-ended fashion, and thus should be interpreted to mean "including but not limited to." Also, the term "couple" or "couples" is intended to mean either an indirect or direct electrical connection, optical connection, etc. Thus, if a first device couples to a second device, that connection may be through a direct electrical connection, or through an indirect electrical connection via other devices and connections. Additionally, the term "system" refers to a collection of two or more hardware components.

The term "initiator" is used to refer to a network element that initiates communication, and, as used in this document, is not associated with a particular protocol, e.g. iSCSI, but with all protocols. The term "target" is used to refer to a network element that responds to the initiator, and, as used in this document, is not associated with a particular protocol, e.g. iSCSI, but with all protocols.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims, unless otherwise specified. The discussion of any embodiment is meant only to be illustrative of that embodiment, and not intended to intimate that the scope of the disclosure, including the claims, is limited to that embodiment.

Figure 1:
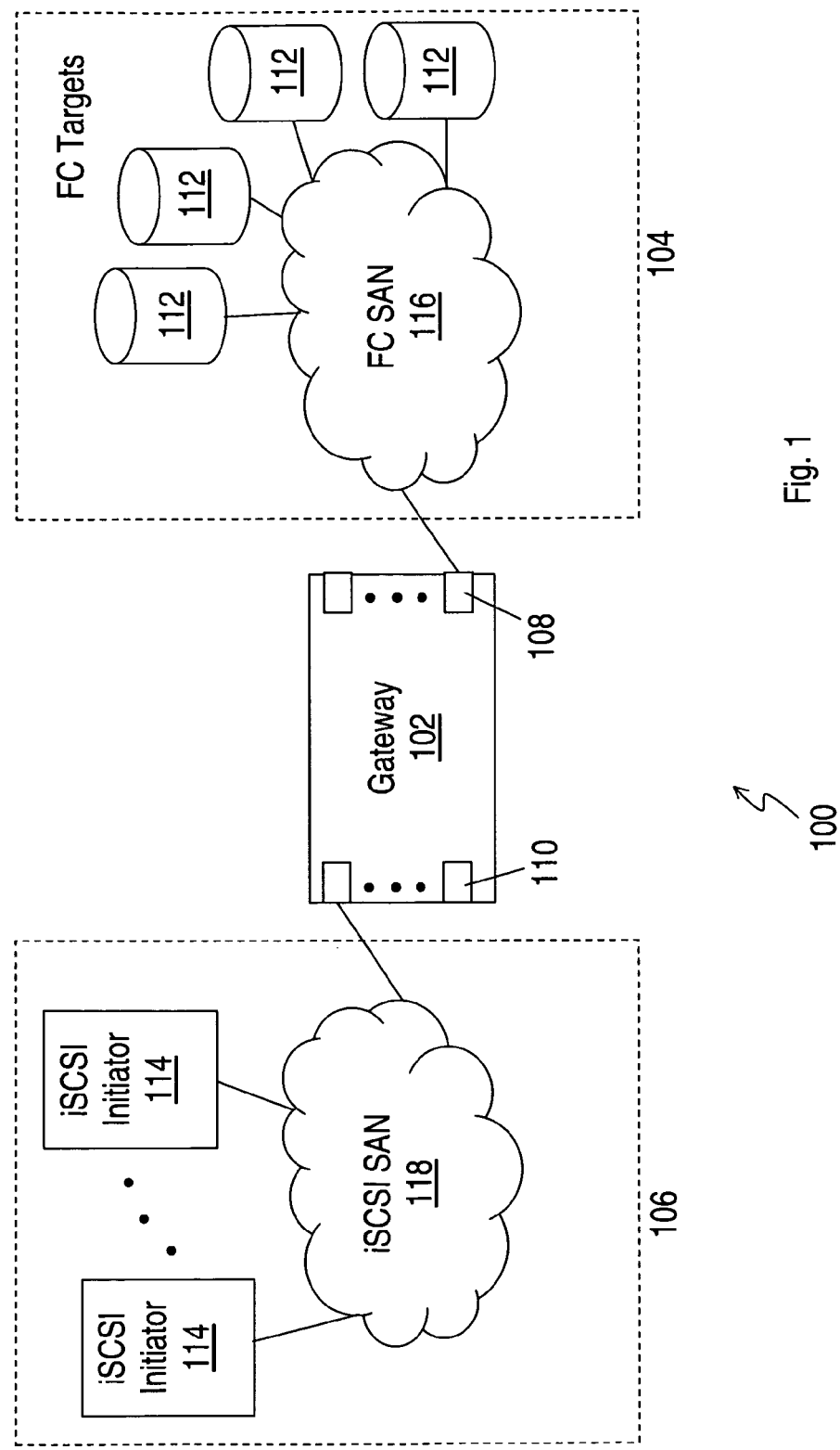
FIG. 1 illustrates a computer network in accordance with at least some embodiments.

FIG. 1 illustrates a system 100 including a gateway 102 coupled to a Fibre Channel ("FC") network 104 and an Internet Small Computer System Interface ("iSCSI") network 106 through at least one FC port 108 and at least one iSCSI port 110, respectively. Multiple ports may be used to connect to a smaller or larger amount of network elements. A discussion of FC and iSCSI protocol will be helpful.

FC protocol can carry data at rates exceeding 2 Gbps in both directions simultaneously, and defines standard media and signaling conventions for transporting data in a serial fashion. FC also provides a frame structure for transporting the data; the frame structure is termed a "Fibre Channel frame" or simply a "frame." In FC, the "Originator Exchange Identifier," or "OX_ID," is a 16-bit field in the frame that uniquely identifies the "originator" of a communication session. The communication session is also termed an "exchange". An originator initiates exchanges while a "responder" replies to exchanges that the responder receives. An OX_ID value of 0xFFFF indicates that the OX_ID is unassigned. Similarly, the "responder exchange identifier," or "RX_ID," is a 16-bit field in the frame that uniquely identifies the responder of an exchange, and a RX_ID value of 0xFFFF indicates that the RX_ID is unassigned. In the first frame of an exchange, the originator assigns the OX_ID by setting the OX_ID value to a value other than 0xFFFF. The originator sets the RX_ID value to 0xFFFF, the unassigned value. Upon receipt of the first frame, the responder assigns the RX_ID by setting the RX_ID value to a value other than 0xFFFF. The assigned values for the OX_ID and RX_ID are used for all subsequent frames in the exchange. The "Destination Identifier," or "D_ID," is a 3-byte field in the frame used to indicate the targeted destination of the transmitted frame to network elements.

iSCSI protocol allows the use of the SCSI protocol over Transmission Control Protocol/Internet Protocol ("TCP/IP") networks. SCSI is a set of standards for physically connecting and transferring data between computers and peripheral devices such as hard disks, tape drives, scanners, and optical drives. SCSI is a client-server architecture. Clients of a SCSI interface are termed "initiators." Initiators issue SCSI "commands" to request services from components, also known as logical units, of a server. The servers are known as "targets." The initiator is one endpoint of a SCSI transport, and the target is the other endpoint. As used in this document, however, the terms "initiator" and "target" are not indicative that SCSI or iSCSI protocol is in use, but apply generally.

SCSI commands are sent in a Command Descriptor Block ("CDB"). The CDB includes a one-byte operation code followed by five or more bytes containing command-specific parameters. A target can contain multiple logical units. Each logical unit has an address within the target termed a logical unit number ("LUN"), the value of which is used to identify the logical unit during a communication session. The LUN field is 64 bits.

The use of protocols other than iSCSI and FC will become apparent to those skilled in the art, and using such protocols is within the scope of the present disclosure. Returning to FIG. 1, the gateway 102 is coupled to iSCSI initiators 114 and FC targets 112. Such coupling may be through iSCSI storage area networks ("SANs") 118 and FC SANs 116, respectively. A SAN is any arrangement of interconnected network elements that transport packets of information between any attached devices. Network elements include routers, switches, initiators, targets, etc.

Figure 1B:
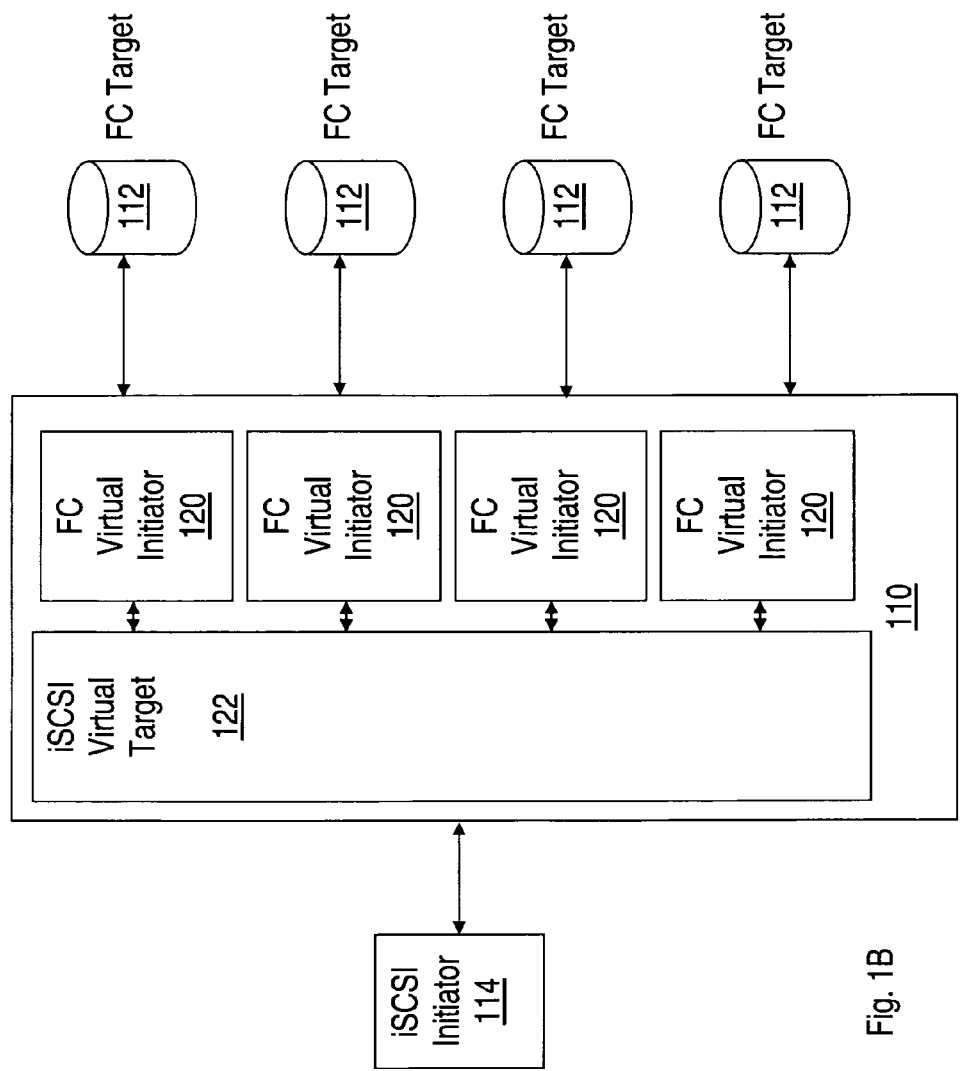
FIG. 1B illustrates an iSCSI port in accordance with at least some embodiments.

FIG. 1B illustrates an iSCSI port 110, which couples, and is coupled to, an iSCSI initiator 114 and multiple FC targets 112 (the gateway 102 and FC port 108 are not pictured). The port 110 includes a virtual iSCSI target 122 and multiple virtual FC initiators 120. A virtual iSCSI target 122 is an emulation of an iSCSI target in software. Similarly, the virtual FC initiators are emulations of FC initiators in software. Also, the port 110 preferably converts iSCSI packets into Fibre Channel frames and vice versa. As such, the FC targets 112, from their own point of view, appear to be responding to communication from FC initiators, while the iSCSI initiator 114, from its own point of view, appears to be initiating communication with an iSCSI target. Objectively, the iSCSI port 110 is facilitating communication between the iSCSI initiator 114 and the FC targets 112.

In order for multiple FC targets 112 to communicate with one iSCSI initiator 114 through the iSCSI port 110, each FC target 112 should be uniquely identified despite differing protocols. As such, the iSCSI port 110 proxies the multiple FC targets 112 as a single virtual iSCSI target 122 and divides a communication identifier range associated with the iSCSI protocol, the LUN range, into multiple subdivided communication identifier ranges, or subdivided LUN ranges. The iSCSI port 110 preferably also associates each of the FC targets 112 with one of the subdivided LUN ranges. By associating each FC target 112 with a subdivided LUN range, each iSCSI initiator 114 may use multiple LUNs to communicate with a particular FC target 114 as long as the LUNs are within the subdivided LUN range. As such, upon receipt of an iSCSI packet from the iSCSI initiator 114, the iSCSI port 110 is configured to use the LUN in the packet to identify communication directed to a particular FC target 112. Preferably, the iSCSI port 110 is configured to determine the subdivided LUN range to which the LUN belongs, and determine the FC target 112 which is associated with that subdivided LUN range. The iSCSI port 110 preferably creates and stores a data structure with all the subdivided range associations, and accesses the data structure to determine such associations.

Preferably, the subdivided LUN ranges do not overlap with each other, and each subdivided LUN range is continuous. Such restrictions, while not mandatory, reduce the complexity of the data structure associating the subdivided LUN ranges with the FC targets 114, thus minimizing the time needed to access the structure. Also, the entire set of assignable identifiers need not be subdivided; rather, only a portion of the entire set may be subdivided. For example, the subset range of {0-255} may be divided into subdivided LUN ranges. As pictured, the iSCSI port 110 proxies the 4 FC targets 112 as a single virtual iSCSI target 122, and consequently, will divide the LUN range into four subdivided ranges, {0-63, 64-127, . . . }, each range associated with one of the FC targets 112.

The iSCSI port 110 preferably inserts a D_ID into the FC frame, converted from the iSCSI packet, the D_ID selected according to which FC target 112 the communication is directed. The iSCSI port 110 also inserts an OX_ID into the frame. The OX_ID inserted is associated with the particular iSCSI initiator 114 that sent the communication. As such, upon receiving a response to communication, the FC virtual initiator 120 identifies to which iSCSI initiator 114 to direct the packet using the OX_ID. The OX_ID range is divided into subdivided communication identifier ranges similar to how the LUN range is divided. For example, the assignable OX_ID range {0x0000-0xFFFE} is divided into 64 subdivided ranges {0x0000-0x03FF, 0x0400-0x07FF, . . . } such that the port 110 can support communication sessions between 64 iSCSI initiators 114 and the FC target 112 simultaneously. Communication identified with an OX_ID value of 0x0001 and 0x000A would be directed to one iSCSI initiator because the values belong to the first subdivided OX_ID range. Communication identified with an OX_ID value of 0x0400 would be directed to another iSCSI initiator because the value belongs to another subdivided OX_ID range. Preferably, the iSCSI port 110 creates and stores a data structure with all the subdivided range associations, and accesses the data structure to determine such associations.

Preferably, the subdivided OX_ID ranges do not overlap with each other, and each subdivided OX_ID range is continuous. Such restrictions, while not mandatory, reduce the complexity of the data structure associating the subdivided OX_ID ranges with the iSCSI initiators 114. Also, the entire set of assignable identifiers need not be subdivided; rather, only a portion of the entire set may be subdivided. Preferably, a range of 4096 identifiers is used (e.g., the identifiers between 0x0000 and 0x1000 divided among 64 iSCSI initiators). Also, each iSCSI port 110 and FC port 108 are configured as described above, allowing for scaling of the amount of network elements in the system 100 based on the number of ports.

FIG. 2 illustrates a method 200 of proxying a plurality of FC targets as a virtual iSCSI target, beginning at 202 and ending at 214. At 204, an iSCSI packet intended for a FC target is received at a virtual iSCSI target from an iSCSI initiator. The range of possible LUNs is 0x0000000000000000-0xFFFFFFFFFFFFFFFF, but preferably, a subset of the range, 0x00-FF (0-255), is divided into subdivided ranges of communication identifiers. Also, a data structure associating each subdivided range of communication identifiers with one of the FC targets, preferably is constructed. The data structure is updated as initiators and targets are added and removed from their respective networks.

At 206, the FC target to which the communication is directed is identified out of the multiple FC targets based on the LUN in the packet. Preferably, the subdivided LUN range comprising the LUN is determined, and the FC target associated with the subdivided LUN range is determined. Subsequently, the iSCSI packet is converted to a FC frame. Depending on which types of protocols are used, a protocol conversion may involve encapsulation and decapsulation of packets, including stripping and adding protocol headers. For example, to convert a FC frame into an iSCSI packet, the cyclic redundancy check value ("CRC") is deleted from the frame, and an Ethernet header is added. To convert an iSCSI packet into a FC frame, a CRC is appended to the payload of the packet. The use of any and all protocols is within the scope of this document.

At 208, a D_ID associated with the FC target is inserted into the frame. Consequently, the frame will be routed to the correct destination. At 210, an OX_ID associated with the iSCSI initiator is inserted into the frame. Preferably, the OX_ID range has been subdivided according to the number of iSCSI initiators, e.g. 64, and each iSCSI initiator is associated with a subdivided OX_ID range. Consequently, any response to the frame will be directed to the correct iSCSI initiator 114 based on the OX_ID. Specifically, the subdivided OX_ID range comprising the OX_ID will be determined, and the iSCSI initiator associated with the subdivided OX_ID range will be determined. Preferably, the iSCSI initiators are associated with the subdivided OX_ID ranges in a one-to-one ratio as well. At 212, the frame is sent from a virtual FC initiator to the FC target.

Figure 3:
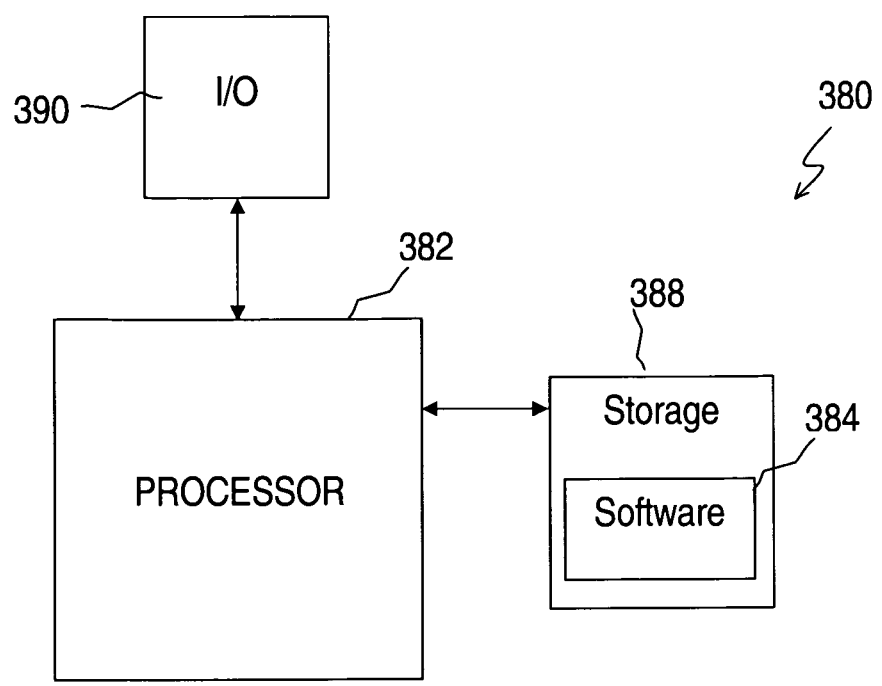
FIG. 3 illustrates a general-purpose computer suitable for implementing one or more embodiments described herein.

The system described above may be implemented on any general-purpose computer with sufficient processing power, memory resources, and throughput capability to handle the necessary workload placed upon the computer. FIG. 3 illustrates a typical, general-purpose computer system 380 suitable for implementing one or more embodiments disclosed herein. The computer system 380 includes a processor 382 (which may be referred to as a central processor unit or CPU) that is in communication with memory devices including storage 388, and input/output (I/O) 390 devices. The processor may be implemented as one or more CPU chips.

In various embodiments, the storage 388 includes a computer readable medium such as volatile memory (e.g., RAM), non-volatile storage (e.g., Flash memory, hard disk drive, CD ROM, etc.), or combinations thereof. The storage 388 includes software 384 that is executed by the processor 382. One or more of the actions described herein are performed by the processor 382 during execution of the software 384.

Figure 4:
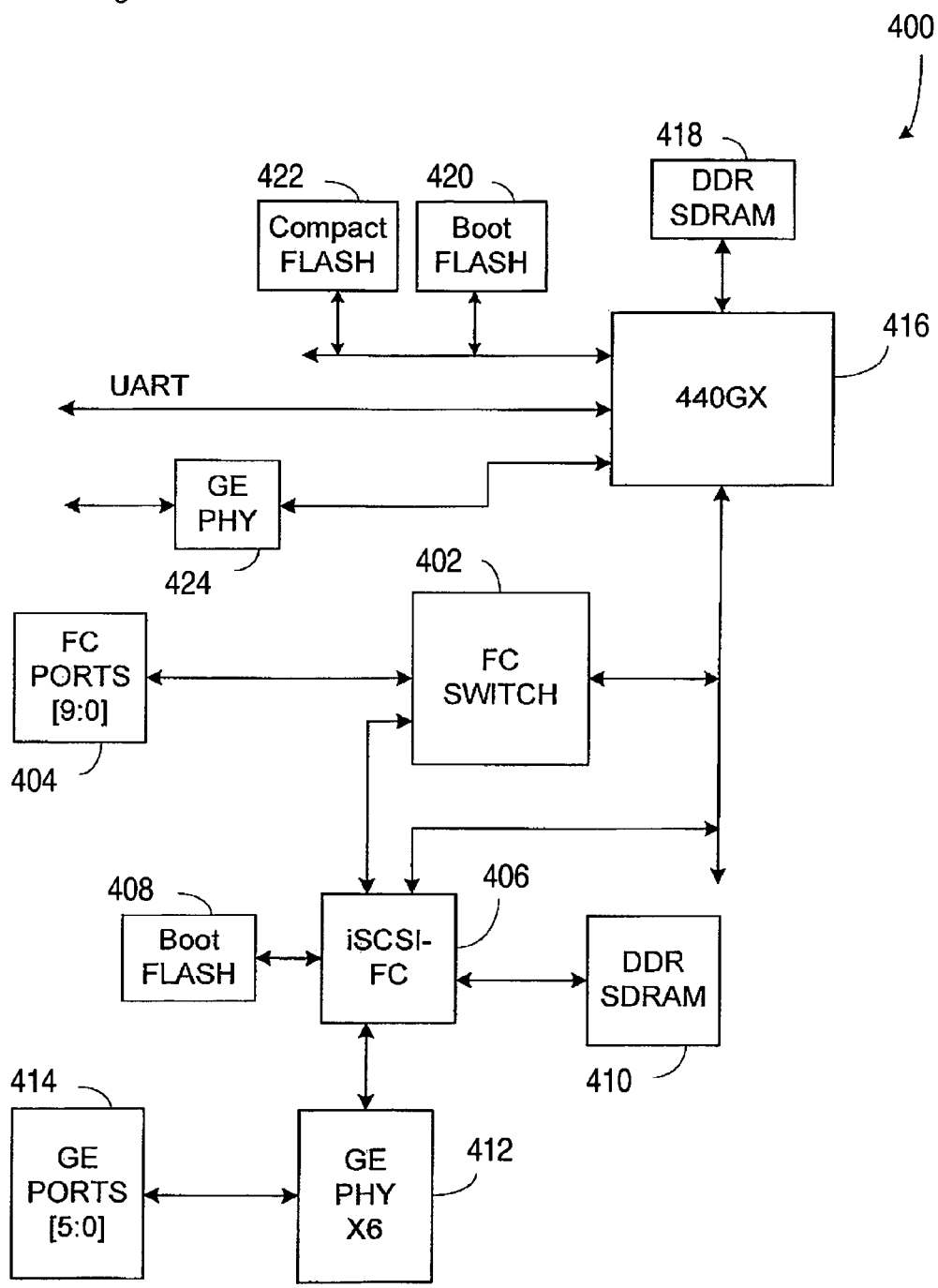
FIG. 4 is a block diagram of a gateway according to the preferred embodiment.

FIG. 4 illustrates the preferred embodiment of the gateway 102. A Fibre Channel switch 402 and an iSCSI to Fibre Channel conversion block 406 are the primary components of the gateway 400. The switch 402 has associated Fibre Channel ports 404. The iSCSI to Fibre Channel conversion block 406 preferably includes network processor or processors such as the BCM 1125 from Broadcom. Boot FLASH 408 is provided to contain the firmware used by the network processor. SDRAM 410 provides both working RAM and temporary packet storage functions for the network processor. An Ethernet PHY 412 and its related Ethernet ports 414 are connected to the iSCSI to Fibre Channel conversion block to form the iSCSI port. The iSCSI to Fibre Channel conversion block 406 is connected to the Fibre Channel switch 402 using a Fibre Channel link.

A processor 416 performs high level operations for the gateway with both the iSCSI and Fibre Channel fabrics and performs control functions over the Fibre Channel switch 402 and the iSCSI to Fibre Channel conversion block 406. RAM 418 provides working memory for the processor 416, with FLASH 420 containing the basic firmware code and FLASH 422 providing long term bulk storage. An Ethernet PHY 424 is provided to provide an out of band management connection to the gateway 400, along with a UART connection.

The above disclosure is meant to be illustrative of the principles and various embodiment of the present invention. Numerous variations and modifications will become apparent to those skilled in the art once the above disclosure is fully appreciated. For example, the order of the actions shown in FIG. 2 can be varied from the order shown, and two or more of the actions may be performed concurrently. Also, protocols other than FC and iSCSI may be used. It is intended that the following claims be interpreted to embrace all such variations and modifications.

We claim:

1. A gateway, comprising:
    a first port; and
    a second port,
    wherein the second port is configured to facilitate communication between a plurality of first protocol targets and a second protocol initiator, a second protocol different from a first protocol, the second protocol comprising iSCSI protocol;
    wherein the second port is configured to use multiple Logical Unit Numbers ("LUNs") assigned to a first protocol target out of the plurality of first protocol targets for communication between the first protocol target and the second protocol initiator; and
    wherein the second port is configured to insert a first protocol communication identifier associated with the second protocol initiator into the communication.

2. The gateway of claim 1, wherein the second port is configured to use a second protocol subdivided communication identifier range, out of a plurality of second protocol subdivided communication identifier ranges, to identify communication between the first protocol target and the second protocol initiator.

3. The gateway of claim 1, wherein the second port comprises an iSCSI port.

4. The gateway of claim 1,
    wherein the second port is configured to communicate with the second protocol initiator via a virtual second protocol target; and
    wherein the second port is configured to communicate with the plurality of first protocol targets via a plurality of virtual first protocol initiators.

5. The gateway of claim 1, wherein the plurality of first protocol targets are associated with a plurality of second protocol subdivided communication identifier ranges.

6. The gateway of claim 5, wherein the multiple LUNs are in one of the subdivided communication identifier ranges.

7. The gateway of claim 1, wherein the LUNs are part of a subdivided LUN range.

8. The gateway of claim 1, wherein the second port is configured to:

insert a Originator Exchange Identifier ("OX—ID") identifying the second protocol initiator into the communication.

9. The gateway of claim 1, A gateway, comprising:

a first port; and a second port, wherein the second port is configured to facilitate communication between a plurality of first protocol targets and a second protocol initiator, a second protocol different from a first protocol, the second protocol comprising iSCSI protocol;

wherein the second port is configured to use multiple Logical Unit Numbers ("LUNs") assigned to a first protocol target out of the plurality of first protocol targets for communication between the first protocol target and the second protocol initiator, and wherein the second port is configured to proxy the plurality of first protocol targets as a virtual second protocol target.

* * * * *